Jan. 13, 1931.  F. TINTNER  1,789,163
STRETCHER STAND FOR VEHICLES
Filed Jan. 6, 1927    2 Sheets-Sheet 1
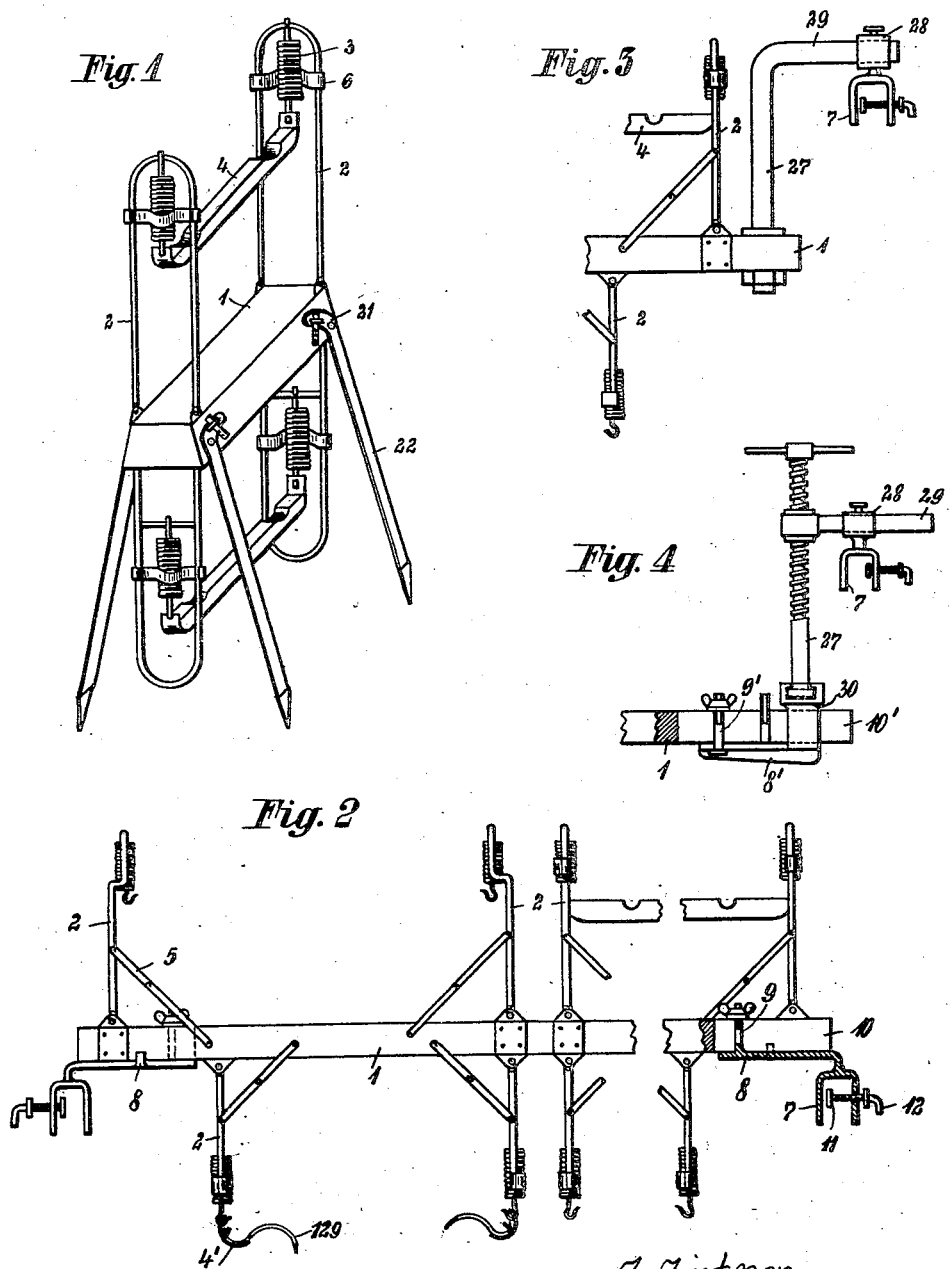

Jan. 13, 1931.   F. TINTNER   1,789,163
STRETCHER STAND FOR VEHICLES
Filed Jan. 6, 1927   2 Sheets-Sheet 2
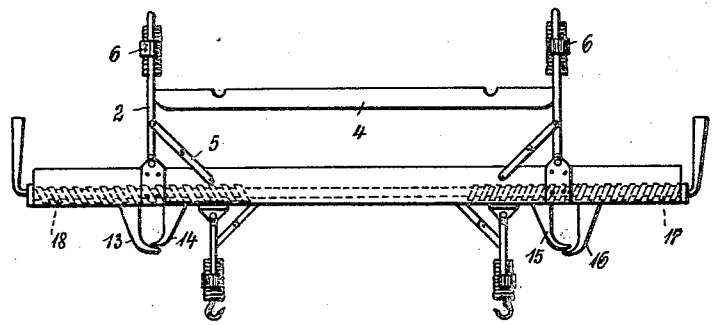
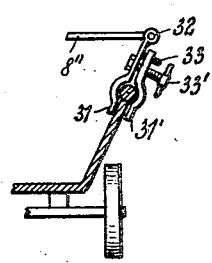
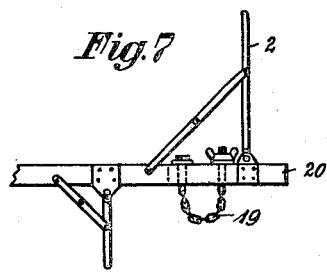
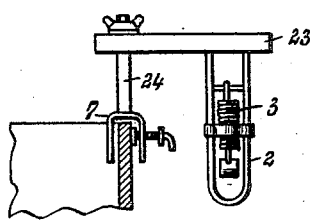
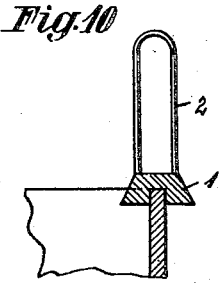
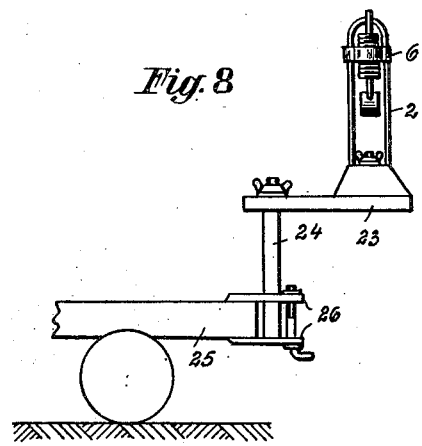

Patented Jan. 13, 1931

1,789,163

UNITED STATES PATENT OFFICE

FRITZ TINTNER, OF VIENNA, AUSTRIA

STRETCHER STAND FOR VEHICLES

Application filed January 6, 1927, Serial No. 159,483, and in Czechoslovakia February 16, 1925.

This invention relates to stands for the transport of stretchers (with patients) in vehicles of all kinds. These stands have arms or supporting members, on which the bearing members for the stretchers are supported by means of springs. The invention consists in this, that the said supporting members are made in the form of U-shaped stirrups, the springs being positioned between the limbs of the stirrups. The invention further consists of various constructional forms of the stand.

The accompanying drawing shows different constructional forms of the invention, Fig. 1 being a perspective view and Figs. 2, 3, 4, 5, 6, 7, 8, 9 and 10 being elevations.

The stand consists of a supporting beam 1 with supporting members 2, to which by means of springs 3 supporting beams 4 for the stretcher are attached. The supporting members 2 and struts 5 are capable of being folded against the beam 1 for making the stand more conveniently transportable when out of use. In the stand shown in Fig. 1, which is suitable for placing in wagons, the legs 22 are also made so as to fold and are capable of being adjusted by means of clamping screws 21.

In accordance with the invention the supporting members 2 are made in the form of U-shaped stirrups, between the limbs of which the springs 3 are located. This saves space and enables the beam 1 to be made as short as possible. The springs are also protected between the limbs. The supporting members 2 are preferably provided with abutments 6 embracing the springs for preventing the springs and the stretcher (with the patient lying on it) from swinging outwards while the vehicle is in motion.

In the stand shown in Fig. 2, which is more particularly suitable for vehicles having sides (for instance lorries), the supporting beam 1 is provided with fixing stirrups 7 which are capable of being slid on and fixed to the beam 1 (for instance by means of screws 9 in slots 10 in the beam). The stand is placed with the stirrups 7 on the sides of the vehicle, the distance between the two stirrups being adapted to that between the sides of the vehicle. Each stirrup may be provided with a plate 8 which serves both as a guide for the stirrup on the beam 1 and for extending the same (in the case of particularly wide lorries). The stirrups are provided with a pressure plate 11 which is pressed against the side of the vehicle by means of a clamping screw 12.

Fig. 3 shows a modification of the stand for vehicles having high sides. In order to place the stand or the stretcher in such a vehicle as low as possible (for the sake of stability) in spite of the height of the sides, the supporting beam 1 is cranked downwards between the attaching stirrups 7, the stirrup 7 being thus arranged on the upwardly cranked ends of the beam 1. Instead of this the stirrups 7 may be mounted on pillars 27, the lower ends of which are connected to the beam 1. Each stirrup 7 may be slidable on the bent over upper end of the pillar or on a horizontal arm 29 of the same with a sleeve 28, whereby the stand is capable of being adapted to vehicles of different widths.

The stirrup 7 may also be vertically adjustable, the pillar 27 being for instance capable of sliding vertically with respect to the beam 1, or the arm 29, as in Fig. 4, forming a separate part which can be slid up and down the pillar 27.

For this purpose the pillar 27 may be a threaded spindle which is journalled so as to be capable of turning in a base part mounted on the beam.

This base part of the spindle 27 may suitably be constituted by a socket 30 supporting the spindle and capable of sliding on the beam 1 and by a base plate 8' with a clamping bolt 9' capable of sliding in a slot 10' in the beam. This makes the pillar 27 capable of being slid horizontally and fixed on the beam 1.

Through the fixing stirrups 7 being horizontally slidable on the arms 29 and the pillars 27 on the beam 1, it is possible to fix the stand on the widest and narrowest vehicles.

On the plate 8 or 8' in place of a bolt 9 or 9' two bolts 9 or 9' may be provided

(see Fig. 4), one of which serves the purpose of fixing the plate and the other acts only as a guide.

The stands shown in Figs. 5, 6 and 7 are more particularly suitable for agricultural vehicles (for instance so-called open-spar wagons with two open-spar sides or longitudinal spars).

According to Fig. 5 the beam 1 is provided with screw spindles 17, 18 (with handles), along which pairs of gripping jaws 13, 14 and 15, 16 are capable of being displaced longitudinally. The stand with the beam 1 is laid transversely across the longitudinal spars of the vehicle, the relative distance of the two pairs of jaws being adapted to the distance between the longitudinal spars. The two jaws of each pair are thereupon pressed against the longitudinal spar lying between them, whereby the beam 1 is fixed in position on the vehicle.

According to Fig. 6, to either end of the supporting beam 1 a fixing stirrup or jaw 31 is pivoted, which is capable of being clamped to the walls of the vehicle. The jaw 31 may for this purpose be attached by means of a hinge 32 to the plate 8″ which is capable of being fixed to the beam in any suitable manner, for instance similarly to the plate 8 or 8′ of Figs. 2 or 4. The jaw may be made in a single piece or may consist of two parts 31, 31′, the lower ends of which grip the longitudinal spar and the wall of the vehicle and the upper parts of which are connected together or pressed against one another by means of screws 33 and 33′. Through the pivotal connection between the attaching jaws and the beam the latter may be fixed both to the vertical and inclined walls of a vehicle.

According to Fig. 7 the beam 1 is provided at either end with a sling 19 (made for instance of a chain) which is capable of sliding in a slot 20, one end of the sling (or both ends) terminating in a nut. The slings 19 on the beam 1—the distance between which is adjustable—are slid over the longitudinal spars of the vehicle, whereupon the slings are shortened by means of the nuts, in which they press against the longitudinal spars.

The stands shown in Figs. 8, 9 and 10 are more particularly suitable for small vehicles, such as trucks, pit tub and the like.

In the stand shown in Fig. 8 (flat open vehicles) the supporting beam 1 is supported on two arms 23 which are capable of swivelling on pillars 24 which are arranged so as to be fixed to the flat top 25, for instance by means of jaws 26. By this means with vehicles of different lengths the distance between the beams 1 of the two stands can be adapted to the length of the stretcher. In the stand shown in Fig. 9 the pillar 24 is fixed to the frame of the vehicle by means of a stirrup 7 (with a pressure plate 12, similar to Fig. 2). In these stands the beams 1 may be omitted and the supporting members 2 mounted directly on the arms 23 (of Fig. 9) and be downwardly directed (instead of upwardly).

In the stand shown in Fig. 10 the supporting beam 1 has a groove on its underside, which rests directly on the side of the vehicle, so that the stand will project only very slightly over the side of the vehicle. This is of advantage, for instance in low galleries in mines.

All these stands can be fixed on the vehicles without adapting them in any way and therefore rapidly and in a simple manner.

Instead of the beams 4 hooks 4′ may be used for supporting the stretcher (Fig. 2), which are linked to the springs 3 and are provided with securing straps 129. The poles of the stretcher are laid into the hooks from above.

The U-shaped stirrups 2 may be cranked (see Fig. 2 left half), preferably at the place where the stretcher support (4 or 4′) is connected to the springs 3. This facilitates the lowering of the stretcher and placing it in position on the supporting member 4 or 4′.

The springs 3, to which the stretcher supporting members (4 or 4′) are attached, may be tension springs or compression springs (on which the supporting members 4 or 4′ rest). The beams 1 may be made of wood, iron or any other suitable material.

What I claim is:

1. A stretcher stand including a substantially U-shaped supporting member having opposed limbs, springs suspended between the limbs of the supporting members, a beam supporting the supporting member, means adjustable in the direction of the beam for mounting the latter on a support, said adjustable means including stirrups slidably engaged with the supporting beam, and slidable connections between the stirrups and supporting beam.

2. A stretcher stand including a substantially U-shaped supporting member having opposed limbs, springs suspended between the limbs of the supporting members, a beam supporting the supporting member, means adjustable in the direction of the beam for mounting the latter on a support, said adjustable means including stirrups adapted to embrace the support, plates carried by the stirrups and slidably engaging the supporting beam and means adjustably securing the plates to said supporting beam.

3. A stretcher supporting stand including main supporting means, a pair of substantially U-shaped supporting members arranged transversely of the main supporting means and each having opposed limbs, a spring suspended between the limbs of the supporting members, a stretcher supporting beam connected with the springs, and an abutment carried by each of the supporting members for increasing the rigidity thereof and for embracing the adjacent spring so as to prevent lateral movement of the supporting beam.

In witness whereof I have hereunto signed my name.

Dr. FRITZ TINTNER.